United States Patent Office 3,037,904
Patented June 5, 1962

3,037,904
PHOSPHORODITHIOATES
John P. Chupp, Kirkwood, Mo., assignor to Monsanto Chemical Company, St. Louis, Mo., a corporation of Delaware
No Drawing. Filed Apr. 8, 1960, Ser. No. 20,836
21 Claims. (Cl. 167—22)

This invention relates to new and useful phosphorodithioates and to methods of making same. Additionally this invention relates to insecticidal compositions containing the new phosphorodithioates as an active ingredient.

The phosphorodithioates of this invention can be represented by the structure

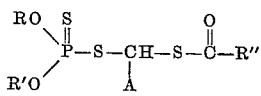

wherein R and R' are like or unlike lower alkyl radicals (i.e. alkyl radicals containing 1 to 5 carbon atoms as exemplified by methyl, ethyl, n-propyl, isopropyl, n-butyl, isobutyl isoamyl and the various other isomeric forms thereof); wherein A is hydrogen or phenyl, i.e. $C_6H_5$, or an alkyl radical containing from 1 to 6 carbon atoms (i.e. methyl, ethyl, propyl, butyl, amyl, hexyl, and the various isomeric forms thereof); and wherein R" is a hydrocarbon radical free of non-benzenoid unsaturation and containing not more than 7 carbon atoms (e.g. the aryl, alkaryl, aralkyl, cycloalkyl, and alkyl radicals as exemplified by phenyl, tolyl, benzyl, cyclohexyl, methylcyclohexyl, cyclopentyl, methyl, ethyl, propyl, butyl, amyl, hexyl, heptyl, and the various isomeric forms thereof free of olefinic and acetylenic unsaturation containing up to 7 carbon atoms).

The compounds of this invention can be prepared by bringing together and reacting under dehydrating conditions substantially equimolecular proportions of (1) A phosphorodithioic acid of the structure

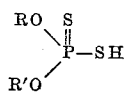

(2) An aldehyde of the structure

and (3) A thiolic acid of the structure

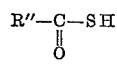

in the presence of a dehydrating agent, R, R', R" and A respectively having the foregoing significance. While a wide range of reaction temperatures can be employed provided the system is fluid (i.e. a temperature above the freezing point of the system and up to and including the boiling point of the system) it is preferred to employ a reaction temperature in the range of 20° C. to 120° C.

As illustrative of the phosphorodithioates of this invention is the following:

S-(acetylthiomethyl) O,O-dimethyl phosphorodithioate
S-(acetylthiomethyl) O,O-diethyl phosphorodithioate
S-(acetylthiomethyl) O,O-diisopropyl phosphorodithioate
S-(propionylthiomethyl) O,O-di-n-butyl phosphorodithioate
S-(isobutyrylthiomethyl) O,O-dimethyl phosphorodithioate
S-(phenacetylthiomethyl) O,O-diethyl phosphorodithioate
S-(n-hexanoylthiomethyl) O,O-dimethyl phosphorodithioate
S-(cyclohexylcarbonylthiomethyl) O,O-diethyl phosphorodithioate
S-(benzoylthiomethyl) O,O-diisoamyl phosphorodithioate
S-[1-(acetylthio)ethyl] O,O-diethyl phosphorodithioate
S-[1-(acetylthio)isobutyl] O,O-diethyl phosphorodithioate
S-[a-(propionylthio)benzyl] O,O-diethyl phosphorodithioate
S-[1-(acetylthio)amyl] O,O-diethyl phosphorodithioate
S-[1-(acetylthio)hexyl] O,O-diethyl phosphorodithioate As illustrative of the preparation of the phosphorodithioates of this invention is the following:

Example I

To a suitable reaction vessel equipped with a thermometer, agitator and reflux condenser is charged while cooling approximately 37.6 parts by weight of O,O-diethyl phosphorodithioic acid, approximately 5.7 parts by weight of paraformaldehyde, approximately 15.2 parts by weight of thiolacetic acid and approximately 10 parts by weight of polyphosphoric acid (84% by weight $P_2O_5$, 16% by weight $H_2O$). The mixture is then heated with agitation for 6 hours at 50–70° C., and then stirred an additional 12 hours at room temperature. The reaction mass is then neutralized with 10% aqueous sodium carbonate. The neutralized reaction mass is then taken up with methylene chloride and the organic solution washed with water. The so-washed organic solution is then subjected to vacuum distillation to remove the methylene chloride. The residue, a yellow liquid, is S-(acetylthiomethyl) O,O-diethyl phosphorodithioate.

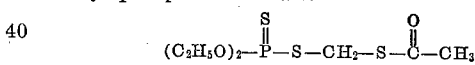

which is soluble in acetone but insoluble in water. Analysis: Theory 35.0% S; found 35.0% S.

Example II

To a suitable reaction vessel equipped with a thermometer, agitator and reflux condenser is charged while cooling approximately 15.2 parts by weight of thiolacetic acid approximately 8.35 parts by weight of acetaldehyde, approximately 37.6 parts by weight of O,O-diethyl phosphorodithioic acid and approximately 20 parts by weight of polyphosphoric acid (84% by weight $P_2O_5$, 16% by weight $H_2O$). The mixture is then heated with agitation for 4 hours at 35° C. The reaction mass is then cooled to room temperature and neutralized with aqueous sodium bicarbonate. The neutralized mass is then taken up with methylene chloride and the organic solution washed with water. The so-washed organic solution is then subjected to vacuum distillation to remove the methylene chloride. The residue, 23.5 parts of a yellow liquid, is S-[1-(acetylthio)ethyl] O,O-diethyl phosphorodithioate,

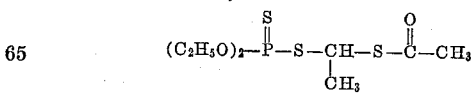

which is soluble in acetone but insoluble in water.

Example III

Employing the procedure of Example II but replacing acetaldehyde with an equimolar amount of isobutyraldehyde there is obtained S-[1-(acetylthio)isobutyl] O,O-diethyl phosphorodithioate.

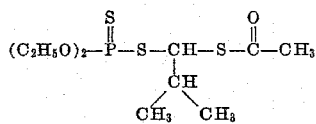

an oil which is soluble in acetone but insoluble in water.

*Example IV*

Employing the procedure of Example I but replacing thiolacetic acid with an equimolar amount of thiolbenzolic acid there is obtained S-(benzoylthiomethyl) O,O-diethyl phosphorodithioate,

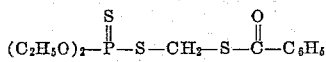

an oil which is soluble in acetone but insoluble in water.

*Example V*

Employing the procedure of Example II but replacing acetaldehyde with an equimolar amount of benzaldehyde there is obtained in 73% yield, S-[a-(acetylthio)benzyl] O,O-diethyl phosphorodithioate,

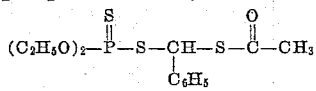

an amber liquid which is soluble in acetone but insoluble in water. Analysis: Theory 8.86% P, 27.4% S; found 9.0% P, 27.4% S.

The methods by which the phosphorodithioates of this invention are isolated will vary slightly with the reactants employed and the product produced. Further purification by selective solvent extraction or by absorptive agents such as activated carbon or clays can precede the removal of the inert organic liquid or solvent. Additionally an inert organic solvent can be added to and in the purification by absorptive agents. However, the product is generally satisfactory for insecticidal purposes without further purification.

In the process of the invention polyphosphoric acids are the preferred dehydrating agents and the term "polyphosphoric acid" refers to a polymeric straight-chain phosphate containing more than one —P—O— unit therein. Examples of such polymeric straight-chain phosphoric acids are pyrophosphoric acid, triphosphoric acid (also known as tripolyphosphoric acid), tetraphosphoric acid and higher polymeric members, of which the metaphosphoric acid (theoretically containing an infinite number of —P—O— units) is the limiting member. Mixtures of the foregoing polyphosphoric acids can also be used and, from the point of view of commercial availability, will generally be preferred. The polyphosphoric acids, as well as mixtures thereof, can be characterized in terms of molar ratio of $H_2O/P_2O_5$, as well as in terms of the number (or average number) of phosphorus atoms in the polymer chain. In general, acids or mixtures thereof having a molar ratio of $H_2O/P_2O_5$ less than 2.5 will be satisfactory. Acids having such a ratio less than 2 are preferred. Particularly suitable is the so-called tetraphosphoric acid (having an average of four —P—O— units per molecule), which contains about 16–17 weight percent of water of constitution and 83–84 weight percent of $P_2O_5$. Any dehydrating amount of polyphosphoric acid can be used, however it is preferred that the molar ratio of polyphosphoric acid to the aldehyde reactant be at least 1:1 and preferably in excess of 2:1.

The preferred phosphordithioates of this invention can be represented by the structure

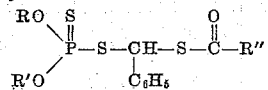

wherein R, R' and R" are alkyl radicals containing from 1 to 2 carbon atoms. These compounds are preferably prepared by reacting under dehydrating conditions benzaldehyde, a phosphordithioic acid of the structure

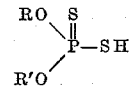

and a thiolic acid of the structure

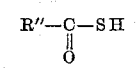

wherein R, R' and R" are alkyl radicals containing from 1 to 2 carbon atoms in the presence of a dehydrating amount of polyphosphoric acid having a molar ratio of $H_2O/P_2O_5$ of less than 2.

It will be understood that the terms "insect" and "insecticide" are used herein in their broad common usage to include spiders, mites, ticks, and like pests which are not in the strict biological sense classed as insects. Thus the usage herein conforms to the definitions provided by Congress in Public Law 104, the "Federal Insecticide, Fungicide, and Rodenticide Act" of 1947, Section 2, subsection *h*, wherein the term "insect" is used to refer not only to those small invertebrate animals belonging mostly to the class Insecta, comprising six-legged, usually winged forms, as beetles, bugs, bees, flies, and so forth, but also to other allied classes of arthropods whose members are wingless and usually have more than six legs, as spiders, mites, ticks, centipedes, and wood lice.

The phosphorodithioates of this invention are effective against a wide variety of insect pests. As illustrative of the activity but not limitative thereof is the following;

One gram of S-[a-(acetylthio) benzyl] O,O-diethyl phosphorodithioate was dissolved in sufficient acetone to make a concentrate solution thereof. Approximately 0.1 cc. of sorbitan monolaurate polyoxyethylene derivative (a commercial water-soluble non-ionic emulsifying agent containing 20 moles of ethylene oxide per mole of sorbitan monolaurate) is then mixed with the concentrate. To this mixture and with agitation is added sufficient water to provide an aqueous emulsion having a concentration of 0.0063% by weight of S-[a-(acethylthio)benzyl] O,O-diethyl phosphorodithioate. Thereupon lima bean plant leaves previously infested with the two-spotted spider mite, *Tetranychus telarius* (L.), are dipped in the aqueous emulsion, withdrawn, and set aside for observation. At the end of 48 hours a 100% kill of the mobile stage of the mite was noted. Seven days after setting the test specimen aside, residual activity was confirmed, a 100% kill of both the resting stage and the ova stage being noted. Similar results against the mobile, resting and ova stages of the same mite were obtained employing S-[1-(acetylthio)ethyl] O,O-diethyl phosphorodithioate at the same concentration. Employing S-(acetylthiomethyl) O,O-diethyl phosphorodithioate in the same test at a concentration of 0.1% by weight a kill of 100% of the mobile stage of the same mite was observed. In contrast at a concentration of 0.2% by weight S-[2-(acetyloxy)ethyl] O,O-diethyl phosphorodithioate was completely inactive in this same test.

Employing the phosphorodithioates of Examples I, II and V, respectively, at concentrations of 1.3 p.p.m. against yellow fever mosquito larvae, *Aedes aegypti*, 100% kills were observed.

Although the phosphorodithioates of this invention are useful per se in controlling a wide variety of insect pests, it is preferable that they be supplied to the pests or to the environment of the pest or pests in a dispersed form in a suitable extending agent.

In the instant specification and appended claims it is to be understood that the term "dispersed" is used in its widest possible sense. When it is said that the phosphorodithioates of this invention are dispersed, it means that the particles of the phosphorodithioates of this invention may be molecular in size and held in true solution in a suitable organic solvent. It means further, that the particles may be colloidal in size and distributed throughout a liquid phase in the form of suspensions or emulsions or in the form of particles held in suspension by wetting agents. It also includes particles which are distributed in a semi-solid viscous carrier such as petrolatum or soap or other ointment base in which they may be actually dissolved in the semi-solid or held in suspension in the semi-solid with the aid of suitable wetting or emulsifying agents. The term "dispersed" also means that the particles may be mixed with and distributed throughout a solid carrier providing a mixture in particulate form, e.g. pellets, granules, powders, or dusts. The term "dispersed" also includes mixtures which are suitable for use as aerosols including solutions, suspensions, or emulsions of the phosphorodithioates of this invention in a carrier such as dichloro-difluoromethane and like fluorochloro-alkanes which boil below room temperature at atmospheric pressure.

In the instant specification and appended claims it is to be understood that the expression "extending agent" includes any and all of those substances in which the phosphorodithioates of this invention are dispersed. It includes, therefore, the solvents of a true solution, the liquid phase of suspensions, emulsions or aerosols, the semi-solid carrier of ointments and the solid phase of particulate solids, e.g. pellets, granules, dusts and powders.

The exact concentration of the phosphorodithioates of this invention employed in combatting or controlling insect pests can vary considerably provided the required dosage (i.e., toxic or lethal amount) thereof is supplied to the pests or to the environment of the pests. When the extending agent is a liquid or mixture of liquids (e.g. as in solutions, suspensions, emulsions, or aerosols) the concentration of the phosphorodithioate employed to supply the desired dosage generally will be in the range of 0.001 to 50 percent by weight. When the extending agent is a semi-solid or solid, the concentration of the phosphorodithioate employed to supply the desired dosage generally will be in the range of 0.1 to 25 percent by weight. From a practical point of view, the manufacturer must supply the agriculturist with a low-cost concentrate or spray base or particulate solid base in such form that, by merely mixing with water or solid extender (e.g., powdered clay or talc) or other low-cost material available to the agriculturist at the point of use, he will have an easily prepared insecticidal spray or particulate solid. In such a concentrate composition, the phosphorodithioate generally will be present in a concentration of 5 to 95 percent by weight, the residue being any one or more of the well known insecticidal adjuvants, such as the various surface active agents (e.g. detergents, a soap or other emulsifying or wetting agent), surface-active clays, solvents, diluents, carrier media, adhesives, spreading agents, humectants, and the like.

There are a large number of organic liquids which can be used for the preparation of solutions, suspensions or emulsions of the phosphorodithioates of this invention. For example, isopropyl ether, acetone, methyl ethyl ketone, dioxane, cyclohexanone, carbon tetrachloride, ethylene dichloride, tetrachloroethane, hexane, heptane and like higher liquid alkanes, hydrogenated naphthalenes, solvent naphtha, benzene, toluene, xylene petroleum fractions (e.g. those boiling almost entirely under 400° F., and having a flash point above about 80° F., particularly kerosene), mineral oils having an unsulfonatable residue above about 80 percent and preferably above about 90 percent. In those instances wherein there may be concern about the phytoxicity of the organic liquid extending agent a portion of same can be replaced by such low molecular weight aliphatic hydrocarbons as dipentene, diisobutylene, propylene trimer, and the like or suitable polar organic liquids such as the aliphatic ethers and the aliphatic ketones containing not more than about 10 carbon atoms as exemplified by acetone, methyl ethyl ketone, diisobutyl ketone, dioxane, isopropyl ether, and the like. In certain instances, it is advantageous to employ a mixture of organic liquids as the extending agent.

When the phosphorodithioates of this invention are to be supplied to the insect pests or to the environment of the pests as aerosols, it is convenient to dissolve them in a suitable solvent and disperse the resulting solution in dichlorodifluoromethane or like chlorofluoroalkane which boils below room temperature at atmospheric pressure.

The phosphorodithioates of this invention are preferably supplied to the insect pests or to the environment of the insect pests in the form of emulsions or suspensions. Emulsions or suspensions are prepared by dispersing the phosphorodithioate of this invention either per se or in the form of an organic solution thereof in water with the aid of a water-soluble surfactant. The term "surfactant" as employed here and in the appended claims is used as in volume II of Schwartz, Perry and Berch's "Surface Active Agents and Detergents" (1958, Interscience Publishers, Inc., New York) in place of the expression "emulsifying agent," to connote generically the various "emulsifying agents," "dispersing agents," "wetting agents" and "spreading agents" that are adapted to be admixed with the active compounds of this invention in order to secure better wetting and spreading of the active ingredients in the water vehicle or carrier in which they are insoluble through lowering the surface tension of the water (see also Frear "Chemistry of Insecticides, Fungicides and Herbicides," second edition, page 280). These surfactants include the well-known capillary active substances which may be anion-active (or anionic), cation active (or cationic), or non-ionizing (or non-ionic) whch are described in detail in volumes I and II of Schwartz, Perry and Berch's "Surface Active Agents and Detergents" (1958 Interscience Publishers, Inc., New York), and also in the November 1947 issue of Chemical Industries (pages 811–824) in an article entitled "Synthetic Detergents," by John W. McCutcheon, and also in the July, August, September and October 1952 issues of Soap and Sanitary Chemicals under the title "Synthetic Detergents." The disclosures of these articles with respect to surfactants, i.e. the anion-active, cation-active and non-ionizing capillary active substances, are incorporated in this specification by reference in order to avoid unnecessary enlargement of this specification. The preferred surfactants are the water soluble anionic surface-active agents and the water soluble non-ionic surface-active agents set forth in U.S. 2,846,398 (issued August 5, 1958). In general it is preferred that a mixture of water-soluble anionic and water-soluble non-ionic surfactants be employed.

The phosphorodithioates of this invention can be dispersed by suitable methods (e.g., tumbling or grinding) in solid extending agents either of organic or inorganic nature and supplied to the insect pests environment in particulate form. Such solid materials include for example, tricalcium phosphate, calcium carbonate, kaolin, bole, kieselguhr, talc, bentonite, fuller's earth, pyrophyllite diatomaceous earth, calcined magnesia, volcanic ash, sulfur and the like inorganic solid materials, and include for example, such materials of organic nature as powdered cork, powdered wood, and powdered walnut shells. The preferred solid carriers are the adsorbent clays, e.g. bentonite. These mixtures can be used for insecticidal purposes in the dry form, or by addition of water-soluble surfactants or wetting agents the dry particulate solids can be rendered wettable by water so as to obtain stable aqueous dispersions or suspensions suitable for use as sprays.

For special purposes the phosphorodithioates of this invention can be dispersed in a semi-solid extending agent such as petrolatum or soap (e.g. sodium stearate or oleate or palmitate or mixtures thereof) with or without the aid of solubility promoters and/or surfactants or dispersing agents.

In all of the forms described above the dispersions can be provided ready for use in combatting insect pests or they can be provided in a concentrated form suitable for mixing with or dispersing in other extending agents. As illustrative of a particularly useful concentrate is an intimate mixture of phosphorodithioate of this invention with a water-soluble surfactant which lowers the surface tension of water in the weight proportions of 0.1 to 15 parts of surfactant with sufficient of the phosphorodithioate of this invention to make 100 parts by weight. Such a concentrate is particularly adapted to be made into a spray for combatting various forms of insect pests (particularly mites) by the addition of water thereto. As illustrative of such a concentrate is an intimate mixture of 95 parts by weight of S-[a-(acetylthio)benzyl] O,O-diethyl phosphorodithioate and 5 parts by weight of a water-soluble non-ionic surfactant such as the polyoxyethylene derivative of sorbitan monolaurate.

Another useful concentrate adapted to be made into a spray for combatting insects pests (particularly mites) is a solution (preferably as concentrated as possible) of a phosphorodithioate of this invention in an organic solvent therefor. The said liquid concentrate preferably contains dissolved therein a minor amount (e.g., 0.5 to 10 percent by weight of the weight of the new insecticidal agent) of a surfactant (or emulsifying agent), which surfactant is also water-soluble. As illustrative of such a concentrate is a solution of S-[1-(acetylthio)ethyl] O,O-diethyl phosphorodithioate in benzene which solution contains dissolved therein a water-soluble polyoxyethylene glycol non-ionic surfactant and a water-soluble alkylaryl sulfonate anionic surfactant.

Of the surfactants aforementioned in preparing the various emulsifiable, wettable or dispersible compositions or concentrates of this invention, the anionic and non-ionic surfactants are preferred. Of the anionic surfactants, the particularly preferred are the well known water-soluble alkali metal alkylaryl sulfonates as exemplified by sodium decylbenzene sulfonate and sodium dodecylbenzene sulfonate. Of the non-ionic surfactants, the particularly preferred are the water-soluble polyoxyethylene derivatives of alkylphenols (particularly isooctylphenol) and the water-soluble polyoxyethylene derivatives of the mono-higher fatty acid esters of sorbitan containing 15 to 30 moles of ethylene oxide per mole of sorbitan mono-ester or alkylphenol.

In all of the various dispersions described hereinbefore for insecticidal purposes, the active ingredient can be one or more of the compounds of this invention. The compounds of this invention can also be advantageously employed in combination with other pesticides, including, for example, nematocides, bactericides, and herbicides. In this manner it is possible to obtain mixtures which are effective against a wide variety of pests and other forms of noxious life.

In controlling or combatting insect pests the phosphorodithioates of this invention either per se or compositions comprising same are supplied to the insect pests or to their environment in a lethal or toxic amount. This can be done by dispersing the new insecticidal agent or insecticidal composition comprising same in, on or over an infested environment or in, on or over an environment the insect pests frequent, e.g., agricultural soil or other growth media or other media infested with the insect pests or attractable to the pests for habitational or sustenance or propagational purposes, in any conventional fashion which permits contact between the insect pests and the phosphorodithioate of this invention. Such dispersing can be brought about by applying sprays or particulate solid compositions to a surface infested with the insect pests or attractable to the pests, as for example, the surface of an agricultural soil or other media such as the above ground surface of plants by any of the conventional methods, e.g. powder dusters, boom and hand sprayers, and spray dusters. Also for sub-surface application such dispersing can be carried out by simply mixing the new insecticidal agent per se or insecticidal spray or particulate solid compositions comprising same with the infested environment or with the environment the insect pests frequent, or by employing a liquid carrier for the new insecticidal agent to accomplish sub-surface penetration and impregnation therein.

While this invention has been described with respect to certain embodiments, it is to be understood that it is not so limited and that variations and modifications thereof obvious to those skilled in the art can be made without departing from the spirit and scope thereof.

What is claimed is:
1. Phosphorodithioates of the structure

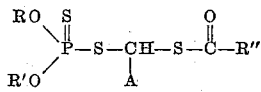

wherein R and R' are lower alkyl radicals; wherein A is selected from the group consisting of hydrogen, phenyl and alkyl radicals containing from 1 to 6 carbon atoms; and wherein R" is a hydrocarbon radical free of non-benzenoid unsaturation and containing not more than 7 carbon atoms.

2. The method for protection of plants against insect attack which comprises applying to the plant an insecticidal amount of at least one compound of claim 1.

3. An insecticidal composition comprising a compound of claim 1 dispersed in an extending agent.

4. An insecticidal composition comprising a compound of claim 1 dispersed in an extending agent, the composition containing 0.1 to 25 percent by weight of said compound of claim 1, the extending agent being selected from the group consisting of solid and semi-solid extending agents.

5. An insecticidal composition comprising a compound of claim 1 dispersed in a liquid extending agent, the composition containing 0.001 to 50 percent by weight of said compound of claim 1.

6. The method of controlling insects which comprises contacting the insects with a toxic amount of a compound of claim 1.

7. Phosphorodithioates of the structure

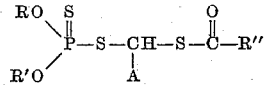

wherein R, R' and R" are alkyl radicals containing from 1 to 2 carbon atoms and wherein A is phenyl.

8. The method of making the compounds of claim 7 which comprises reacting under dehydrating conditions substantially equimolecular proportions of benzaldehyde, a phosphorodithioic acid of the structure

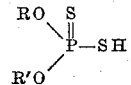

and a thiolic acid of the structure

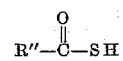

wherein R, R' and R" are alkyl radicals containing from 1 to 2 carbon atoms, in the presence of a dehydrating amount of polyphosphoric acid having a molar ratio of $H_2O/P_2O_5$ less than 2.

9. An insecticidal composition comprising a compound of claim 7 dispersed in an adsorbent clay, the composition containing 0.1 to 25 percent by weight of said compound of claim 7.

10. An insecticidal concentrate comprising a compound of claim 7 and an insecticidal adjuvant, said concentrate containing from 5 to 95 percent by weight of the compound of claim 7.

11. An insecticidal concentrate comprising a compound of claim 7 dispersed in an organic solvent therefor and having dissolved therein a minor amount of a surfactant, said concentrate forming an emulsion with water upon agitation therewith.

12. An insecticidal concentrate adapted to be made into a sprayable composition by the addition of water comprising a compound of claim 7 in admixture with a water-soluble surfactant in the weight proportion of 0.1 to 15 parts of surfactant and sufficient of said compound of claim 7 to make 100 parts by weight.

13. The method of controlling insects which comprises contacting the insects with a toxic amount of a compound of claim 7.

14. The method of protection of plants against insect attack which comprises applying to the plant an insecticidal amount of at least one compound of claim 7.

15. S-(acetylthiomethyl) O,O-diethyl phosphorodithioate.

16. S-[1-(acetylthio)ethyl] O,O-diethyl phosphorodithioate.

17. S-(benzoylthiomethyl) O,O-diethyl phosphorodithioate.

18. S-[a-(acetylthio)benzyl] O,O-diethyl phosphorodithioate.

19. The method of making phosphorodithioates of the structure

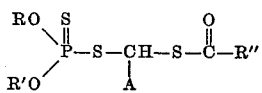

wherein R and R' are lower alkyl radicals, wherein A is selected from the group consisting of hydrogen, phenyl and alkyl radicals containing from 1 to 6 carbon atoms, and wherein R'' is a hydrocarbon radical free of non-benzenoid unsaturation and containing not more than 7 carbon atoms which comprises reacting under dehydrating conditions substantially equimolecular proportions of a phosphorodithioic acid of the structure

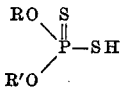

an aldehyde of the structure

and a thiolic acid of the structure

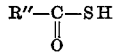

wherein R, R', R'' and A have the same significance as above in the presence of a dehydrating agent.

20. The method of claim 19 wherein the dehydrating agent is polyphosphoric acid.

21. Phosphorodithioates of the structure

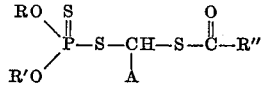

wherein R and R' are lower alkyl radicals, wherein A is phenyl, and wherein R'' is a hydrocarbon radical free of non-benzenoid unsaturation and containing not more than 7 carbon atoms.

References Cited in the file of this patent

UNITED STATES PATENTS 2,862,019    Schrader _____ Nov. 25, 1958